United States Patent
Runze et al.

(10) Patent No.: US 7,809,393 B2
(45) Date of Patent: Oct. 5, 2010

(54) METHOD AND ARRANGEMENT FOR SETTING THE TRANSMISSION OF A MOBILE COMMUNICATION DEVICE

(75) Inventors: Gerhard Runze, Oberasbach (DE); Ralf Burdenski, Nuremberg (DE); Hans Kalveram, Spardorf (DE)

(73) Assignee: NXP B.V., Eindhoven (NL)

( * ) Notice: Subject to any disclaimer, the term of this patent is extended or adjusted under 35 U.S.C. 154(b) by 695 days.

(21) Appl. No.: 10/555,755

(22) PCT Filed: May 6, 2004

(86) PCT No.: PCT/IB2004/050610

§ 371 (c)(1),
(2), (4) Date: Apr. 28, 2008

(87) PCT Pub. No.: WO2004/100396

PCT Pub. Date: Nov. 18, 2004

(65) Prior Publication Data

US 2008/0200199 A1    Aug. 21, 2008

(30) Foreign Application Priority Data

May 9, 2003    (EP)    ................... 03101299

(51) Int. Cl.
H04B 7/00    (2006.01)
(52) U.S. Cl. ........................ 455/522; 455/69
(58) Field of Classification Search ............... 455/522
See application file for complete search history.

(56) References Cited

U.S. PATENT DOCUMENTS

| 4,551,688 | A | * | 11/1985 | Craiglow | 330/280 |
|---|---|---|---|---|---|
| 4,748,326 | A | * | 5/1988 | Mori et al. | 250/585 |
| 5,097,197 | A | * | 3/1992 | Hayase | 323/353 |
| 5,541,606 | A | * | 7/1996 | Lennen | 342/357.12 |
| 5,548,616 | A | | 8/1996 | Mucke et al. | |
| 5,642,116 | A | * | 6/1997 | Gersbach | 341/120 |
| 5,666,118 | A | * | 9/1997 | Gersbach | 341/120 |
| 5,708,681 | A | * | 1/1998 | Malkemes et al. | 375/297 |
| 5,862,460 | A | * | 1/1999 | Rich | 455/116 |
| 5,886,573 | A | * | 3/1999 | Kolanek | 330/10 |
| 6,018,650 | A | * | 1/2000 | Petsko et al. | 455/234.1 |
| 6,125,266 | A | * | 9/2000 | Matero et al. | 455/126 |
| 6,128,353 | A | * | 10/2000 | Ho et al. | 375/345 |
| 6,133,863 | A | * | 10/2000 | Peng | 341/120 |

(Continued)

FOREIGN PATENT DOCUMENTS

JP    11-266168    9/1999

(Continued)

OTHER PUBLICATIONS

Office Action in Japanese patent appln. No. 2006-507559, with English translation (Feb. 9, 2010).

*Primary Examiner*—Duc Nguyen
*Assistant Examiner*—Hai V Nguyen

(57) ABSTRACT

A method for setting the transmitted power of a mobile communication device, particularly for a UMTS, involves setting a transmitted power with great accuracy and a good signal-to-noise ratio. The difference between a measurement of the transmitted power of the signal that is applied to the output antenna and a desired value for transmitted power according to power commands from the base station is used to produce the desired transmitted power.

20 Claims, 3 Drawing Sheets

U.S. PATENT DOCUMENTS

| | | | |
|---|---|---|---|
| 6,229,466 B1* | 5/2001 | Gattani | 341/120 |
| 6,366,622 B1* | 4/2002 | Brown et al. | 375/322 |
| 6,370,203 B1* | 4/2002 | Boesch et al. | 375/297 |
| 6,377,616 B1* | 4/2002 | Brankovic et al. | 375/224 |
| 6,421,397 B1* | 7/2002 | McVey | 375/308 |
| 6,421,398 B1* | 7/2002 | McVey | 375/308 |
| 6,476,670 B1* | 11/2002 | Wright et al. | 330/2 |
| 6,496,063 B2* | 12/2002 | Hinrichsen et al. | 330/129 |
| 6,553,018 B1 | 4/2003 | Ichihara | |
| 6,574,286 B2* | 6/2003 | McVey | 375/308 |
| 6,583,739 B1* | 6/2003 | Kenington | 341/118 |
| 6,584,330 B1* | 6/2003 | Ruuska | 455/574 |
| 6,587,511 B2* | 7/2003 | Barak et al. | 375/295 |
| 6,587,514 B1* | 7/2003 | Wright et al. | 375/296 |
| 6,628,731 B2* | 9/2003 | Auranen et al. | 375/345 |
| 6,633,766 B1* | 10/2003 | van der Pol | 455/522 |
| 6,650,691 B2* | 11/2003 | Cramer, III | 375/146 |
| 6,654,594 B1* | 11/2003 | Hughes et al. | 455/245.1 |
| 6,667,965 B1* | 12/2003 | Yamaura et al. | 370/347 |
| 6,677,823 B2* | 1/2004 | Terosky et al. | 330/289 |
| 6,697,436 B1* | 2/2004 | Wright et al. | 375/296 |
| 6,728,224 B1* | 4/2004 | Kakizaki et al. | 370/313 |
| 6,741,867 B1* | 5/2004 | Tetsuya | 455/522 |
| 6,744,882 B1* | 6/2004 | Gupta et al. | 379/387.01 |
| 6,766,176 B1* | 7/2004 | Gupta et al. | 455/550.1 |
| 6,774,834 B2* | 8/2004 | Dartois | 341/144 |
| 6,785,558 B1* | 8/2004 | Stratford et al. | 455/561 |
| 6,788,236 B2* | 9/2004 | Erdogan et al. | 341/155 |
| 6,788,744 B1 | 9/2004 | Hirama | |
| 6,794,930 B1* | 9/2004 | Nurminen | 330/10 |
| 6,806,844 B2* | 10/2004 | Azuma | 343/853 |
| 6,819,938 B2* | 11/2004 | Sahota | 455/522 |
| 6,842,492 B1* | 1/2005 | Eibling et al. | 375/295 |
| 6,862,327 B2* | 3/2005 | Van Sinderen | 375/345 |
| 6,885,709 B1* | 4/2005 | Dartois | 375/297 |
| 6,940,920 B2* | 9/2005 | Sevenhans et al. | 375/298 |
| 6,983,127 B1* | 1/2006 | Da Torre et al. | 455/67.11 |
| 6,985,033 B1* | 1/2006 | Shirali et al. | 330/149 |
| 6,985,433 B1* | 1/2006 | Laroia et al. | 370/208 |
| 7,027,482 B1* | 4/2006 | Nomura | 375/130 |
| 7,058,380 B2* | 6/2006 | Sato | 455/260 |
| 7,062,234 B2* | 6/2006 | Ocenasek et al. | 455/114.3 |
| 7,076,266 B2* | 7/2006 | Sahota | 455/522 |
| 7,103,377 B2* | 9/2006 | Bauman et al. | 455/522 |
| 7,109,792 B2* | 9/2006 | Leffel | 330/149 |
| 7,116,733 B2* | 10/2006 | Yamanaka et al. | 375/345 |
| 7,120,392 B2* | 10/2006 | Chu et al. | 455/69 |
| 7,151,947 B2* | 12/2006 | Klomsdorf et al. | 455/522 |
| 7,169,995 B2* | 1/2007 | Lin | 84/464 R |
| 7,194,022 B2* | 3/2007 | Honkanen et al. | 375/216 |
| 7,218,850 B2* | 5/2007 | Stuart | 398/26 |
| 7,248,890 B1* | 7/2007 | Raghavan et al. | 455/522 |
| 7,250,894 B2* | 7/2007 | Lee | 341/155 |
| 7,251,290 B2* | 7/2007 | Rashev et al. | 375/297 |
| 7,302,245 B2* | 11/2007 | Yang et al. | 455/232.1 |
| 7,302,246 B2* | 11/2007 | Tseng et al. | 455/232.1 |
| 7,308,042 B2* | 12/2007 | Jin et al. | 375/297 |
| 7,310,381 B2* | 12/2007 | Dinur | 375/297 |
| 7,340,265 B2* | 3/2008 | Husted et al. | 455/501 |
| 7,355,477 B2* | 4/2008 | Mujtaba et al. | 330/285 |
| 7,362,818 B1* | 4/2008 | Smith et al. | 375/296 |
| 7,409,194 B2* | 8/2008 | Shi et al. | 455/126 |
| 7,418,055 B2* | 8/2008 | Wenzel et al. | 375/296 |
| 7,460,841 B2* | 12/2008 | Fischer et al. | 455/127.1 |
| 7,471,738 B2* | 12/2008 | Chan et al. | 375/297 |
| 7,535,385 B2* | 5/2009 | Runze | 341/61 |
| 7,565,389 B2* | 7/2009 | Runze | 708/319 |
| 7,570,929 B1* | 8/2009 | Trompower | 455/114.3 |
| 7,580,481 B2* | 8/2009 | Khoini-Poorfard | 375/324 |
| 7,593,692 B2* | 9/2009 | Hansen et al. | 455/67.11 |
| 7,596,125 B2* | 9/2009 | Alpaslan et al. | 370/342 |
| 7,612,700 B2* | 11/2009 | Kawahito et al. | 341/161 |
| 7,676,208 B2* | 3/2010 | Lee et al. | 455/234.1 |
| 7,715,493 B2* | 5/2010 | Ravi et al. | 375/296 |
| 2002/0047746 A1* | 4/2002 | Dartois | 330/151 |
| 2002/0158688 A1* | 10/2002 | Terosky et al. | 330/129 |
| 2002/0181623 A1* | 12/2002 | Auranen et al. | 375/345 |
| 2002/0191713 A1* | 12/2002 | McVey | 375/308 |
| 2003/0156658 A1* | 8/2003 | Dartois | 375/297 |
| 2003/0227964 A1* | 12/2003 | Honkanen et al. | 375/216 |
| 2004/0021595 A1* | 2/2004 | Erdogan et al. | 341/144 |
| 2004/0070533 A1* | 4/2004 | Azuma | 342/174 |
| 2004/0087285 A1* | 5/2004 | Black et al. | 455/126 |
| 2004/0097210 A1* | 5/2004 | Sato | 455/260 |
| 2004/0121735 A1* | 6/2004 | Tseng et al. | 455/75 |
| 2004/0147235 A1* | 7/2004 | Jin et al. | 455/127.1 |
| 2004/0166821 A1* | 8/2004 | Varra et al. | 455/240.1 |
| 2004/0166884 A1* | 8/2004 | Oh et al. | 455/522 |
| 2004/0176052 A1* | 9/2004 | Vilhonen et al. | 455/127.1 |
| 2004/0198268 A1* | 10/2004 | Rashev et al. | 455/126 |
| 2004/0203983 A1* | 10/2004 | Klomsdorf et al. | 455/522 |
| 2004/0208260 A1* | 10/2004 | Chan et al. | 375/297 |
| 2004/0246048 A1* | 12/2004 | Leyonhjelm et al. | 330/2 |
| 2005/0031341 A1* | 2/2005 | Stuart | 398/26 |
| 2005/0032489 A1* | 2/2005 | Boos | 455/127.3 |
| 2005/0052990 A1* | 3/2005 | Lomnitz | 370/208 |
| 2005/0057303 A1* | 3/2005 | Leffel | 330/75 |
| 2005/0059361 A1* | 3/2005 | Shi et al. | 455/115.1 |
| 2005/0089123 A1* | 4/2005 | Spiegel | 375/345 |
| 2005/0127993 A1* | 6/2005 | Yim et al. | 330/133 |
| 2005/0146453 A1* | 7/2005 | Jensen | 341/131 |
| 2005/0186923 A1* | 8/2005 | Chen et al. | 455/127.1 |
| 2005/0190855 A1* | 9/2005 | Jin et al. | 375/296 |
| 2005/0220201 A1* | 10/2005 | Laroia et al. | 375/260 |
| 2005/0254647 A1* | 11/2005 | Anandakumar et al. | 380/42 |
| 2005/0289201 A1* | 12/2005 | Runze | 708/100 |
| 2006/0035595 A1* | 2/2006 | Shi | 455/73 |
| 2007/0030182 A1* | 2/2007 | Runze | 341/61 |
| 2007/0087704 A1* | 4/2007 | Gilberton | 455/114.3 |
| 2007/0131078 A1* | 6/2007 | Kokkeler | 84/1 |
| 2007/0142080 A1* | 6/2007 | Tanaka et al. | 455/552.1 |
| 2007/0188361 A1* | 8/2007 | Delanghe et al. | 341/118 |
| 2008/0118001 A1* | 5/2008 | Chan et al. | 375/297 |
| 2008/0159453 A1* | 7/2008 | Smith | 375/350 |
| 2009/0074107 A1* | 3/2009 | Chan et al. | 375/297 |
| 2009/0146854 A1* | 6/2009 | Kawahito et al. | 341/120 |
| 2009/0239487 A1* | 9/2009 | Jin et al. | 455/127.2 |
| 2009/0245419 A1* | 10/2009 | Chan et al. | 375/297 |

FOREIGN PATENT DOCUMENTS

| | | |
|---|---|---|
| JP | 11-266168 A | 9/1999 |
| JP | 2000-270032 | 9/2000 |
| JP | 2000-270032 A | 9/2000 |
| JP | 2001-352221 | 12/2001 |
| JP | 2001-352221 A | 12/2001 |

* cited by examiner

METHOD AND ARRANGEMENT FOR SETTING THE TRANSMISSION OF A MOBILE COMMUNICATION DEVICE

The invention relates to a method and an arrangement for setting the transmitted power of a mobile communication device, particularly for a UMTS (universal mobile telecommunication system) system.

In mobile communication systems, and particularly in a UMTS system, there is a requirement for the transmitted power of the mobile communication device to be set with great accuracy. The base stations of the mobile communication system currently specify at what power the mobile communication device is to transmit at any given time. In a UMTS system, a relative accuracy of ±0.5 dB is laid down for the transmitted power.

With conventional analog amplifiers, accuracy of this kind can, at best, be ensured only by complicated and expensive circuitry and complicated and expensive calibration procedures and only in a limited temperature range.

It is an object of the invention to specify a method and an arrangement of the kind stated in the opening paragraph with which high accuracy, with a good signal-to-noise ratio, can be ensured for the transmitted power required at any given time.

With respect to the method the above object is achieved, in accordance with the invention, by virtue of the features of claim 1 and with respect to the arrangement it is achieved by virtue of the features of claim 7.

By the combination of digital and analog amplification, the transmitted power, whether high or low, can be accurately set, thus enabling its relative accuracy to meet even the stringent demands of the UMTS over a wide dynamic range. There is no need for expensive analog amplifiers. Advantage is taken of the high relative accuracy obtained on the basis of digital amplification and of the insensitivity that digital amplification has to fluctuations in the operating voltage and in temperature.

Preferred embodiments can be seen from dependent claims 2 to 5.

The fact that the overall gain is made up of digital gain and analog gain makes it possible, as claimed in claim 6, for self-calibration of the analog amplifiers to be performed in an easy way. Dependent claims 8 and 9 relate to embodiments of the invention.

These and other aspects of the invention are apparent from and will be elucidated with reference to the embodiments described hereinafter.

IN THE DRAWINGS

Figure 1:
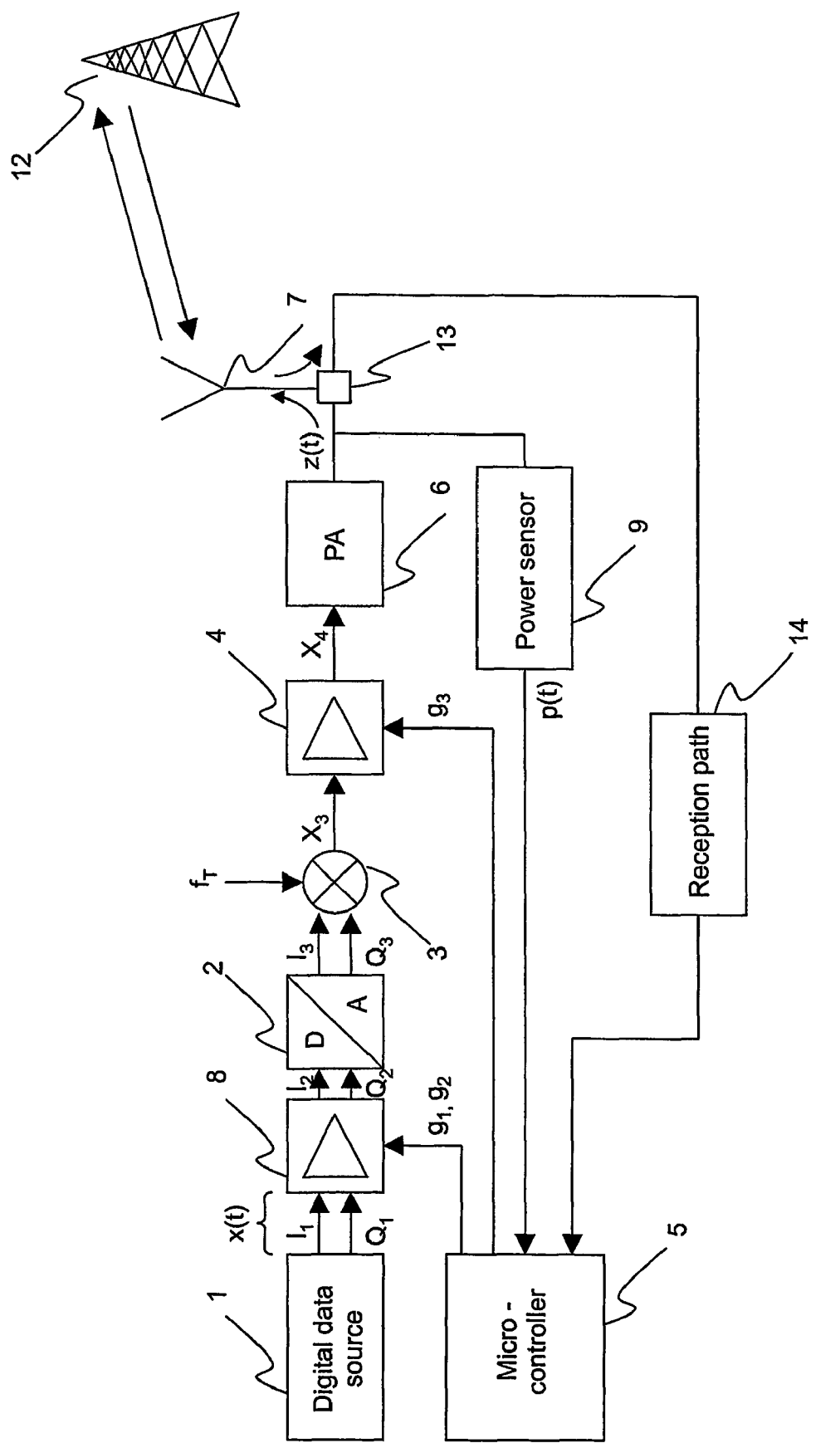
FIG. 1 is a block diagram relating to the setting of transmitted power in a mobile communication device.

In a mobile communication device, a digital data source 1 makes available the information to be transmitted, which is in the form of complex values, as two digital signals $I_1$ and $Q_1$. The digital signals $I_1$ and $Q_1$ are amplified in a digital amplifier 8 to give signals $I_2$ and $Q_2$ and these are converted by a digital-to-analog converter 2 into analog signals $I_3$ and $Q_3$. The latter are modulated in a modulator 3 onto a carrier frequency $f_T$, giving a modulated analog signal $X_3$. There is no need for modulation to an intermediate frequency.

The modulated analog signal $X_3$ is amplified in an analog amplifier 4 (see FIG. 1), or in a plurality of analog amplifiers 4 connected in series (see FIG. 3), to give a signal $X_4$, in which case the analog gain may, depending on the requirements at the time, even be less than 1. The analog signal $X_4$ is fed to a power output stage 6 and is applied as a signal z(t) to an antenna 7 of the mobile communication device.

Figure 3:
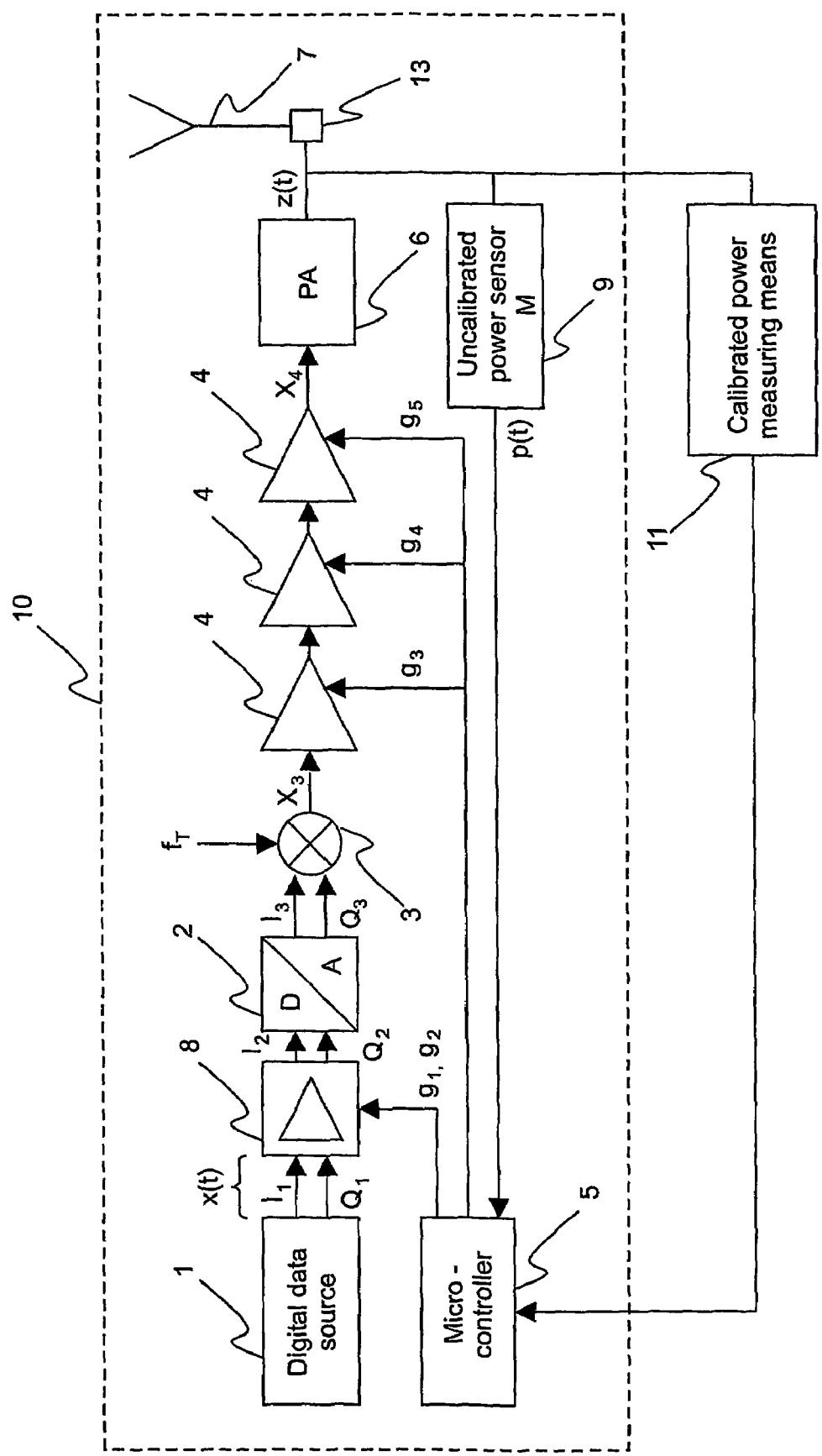
FIG. 3 is a block circuit diagram that corresponds to FIG. 1 and relates to the self-calibration process.

By means of a control circuit 5, which is formed by a micro-controller belonging to the mobile communication device, the gain factors of the digital amplifier 8 can be set via control lines $g_1$ and $g_2$ and the gain factors of the analog amplifier 4 can be set via a control line $g_3$ (see FIG. 1) or via control lines $g_3$, $g_4$, $g_5$ (see FIG. 3). A power sensor 9 measures the actual transmitted power of the signal z(t) that is applied to the antenna 7 and transmits a corresponding signal p(t) giving this information to the control circuit 5. The desired value for transmitted power at the time is transmitted from that base station 12 that is receiving the transmitted signal from the mobile communication device by uplink, the transmission being performed by downlink to the mobile communication device. The base station 12 specifies the change that is necessary or desired to the transmitted power. A conventional duplexer 13 separates the uplink signal from the downlink signal, which is fed via a reception path 14 to the control circuit 5.

The control circuit 5 determines, from the desired value for the transmitted signal and from the actual value of the transmitted signal, the gain factors that are to be set at the digital amplifier 8 and the analog amplifier 4 or amplifiers 4 under the operating circumstances at the time.

By means of the control circuit 5, the overall gain needed for the transmitted power asked for at the time is apportioned between the digital amplifier 8 and the analog amplifier/amplifiers 4.

To optimize the signal-to-noise ratio of the transmitted signal applied to the antenna 7, a high proportion of the overall gain is apportioned to the digital amplifier 8, with the dynamic range of the digital-to-analog converter 2 being exploited to the maximum possible degree. As low as possible a gain factor is set at the analog amplifier 4 or at the analog amplifiers 4, with the sum of the levels of the digital and analog gains producing exactly the desired level of transmitted power that is being asked for at the time by the base station 12. The control circuit 5 controls the digital amplifier 8 in this case in such a way that the digital values of the signal $I_1$ and $Q_1$ are altered sufficiently to allow a comparatively low analog gain in the analog amplifier or amplifiers 4 to be enough to allow the transmitted power being asked for to be achieved. A high signal-to-noise ratio is obtained in this way. The change in the particular digital gain factor may be positive or negative. If the change is positive, then some actual amplification takes place. If the change is negative, then it is attenuation that takes place.

The desired level of transmitted power that is asked for by the particular base station may rise or fall swiftly, within a few milliseconds, for example. The control circuit 5 changes the digital and analog gains with a corresponding swiftness.

Let it be assumed that, for example a) due to a signal for desired transmitted power from the base station 12, gain is to be changed, starting from a previous base state, by +12.5 dB and b) the analog amplifier 4 or the analog amplifiers 4 is/are to be controlled only in steps of . . . 10 dB, 12 dB, 14 dB, 16 dB . . . and c) in the base state, the digital amplifier 8 is only able to attenuate, because it is being fully driven at its maximum gain in the dynamic range of the digital-to-analog converter.

To obtain the increase in gain by +12.5 dB, the analog amplifier 4 is then set to +14 dB and the digital amplifier 8 is set to an attenuation of −1.5 dB.

If, to take another example, the gain is to be changed by +12 dB, then under the above assumptions the analog amplifier 4 will be set to +12 dB and the digital amplifier to 0 dB.

Use of the arrangement described is particularly advantageous when the gain factor of the analog amplifier 4 does not have a linear range of adjustment but can only be adjusted in steps. An analog gain factor that differs from the overall gain desired at the time can then be supplemented by the digital amplifier 8 in such a way that the desired overall gain is set with sufficient accuracy. What is also beneficial in this case is the fact that the digital gain, unlike the analog gain, is not dependent on fluctuations in voltage and fluctuations in temperature.

Figure 2:
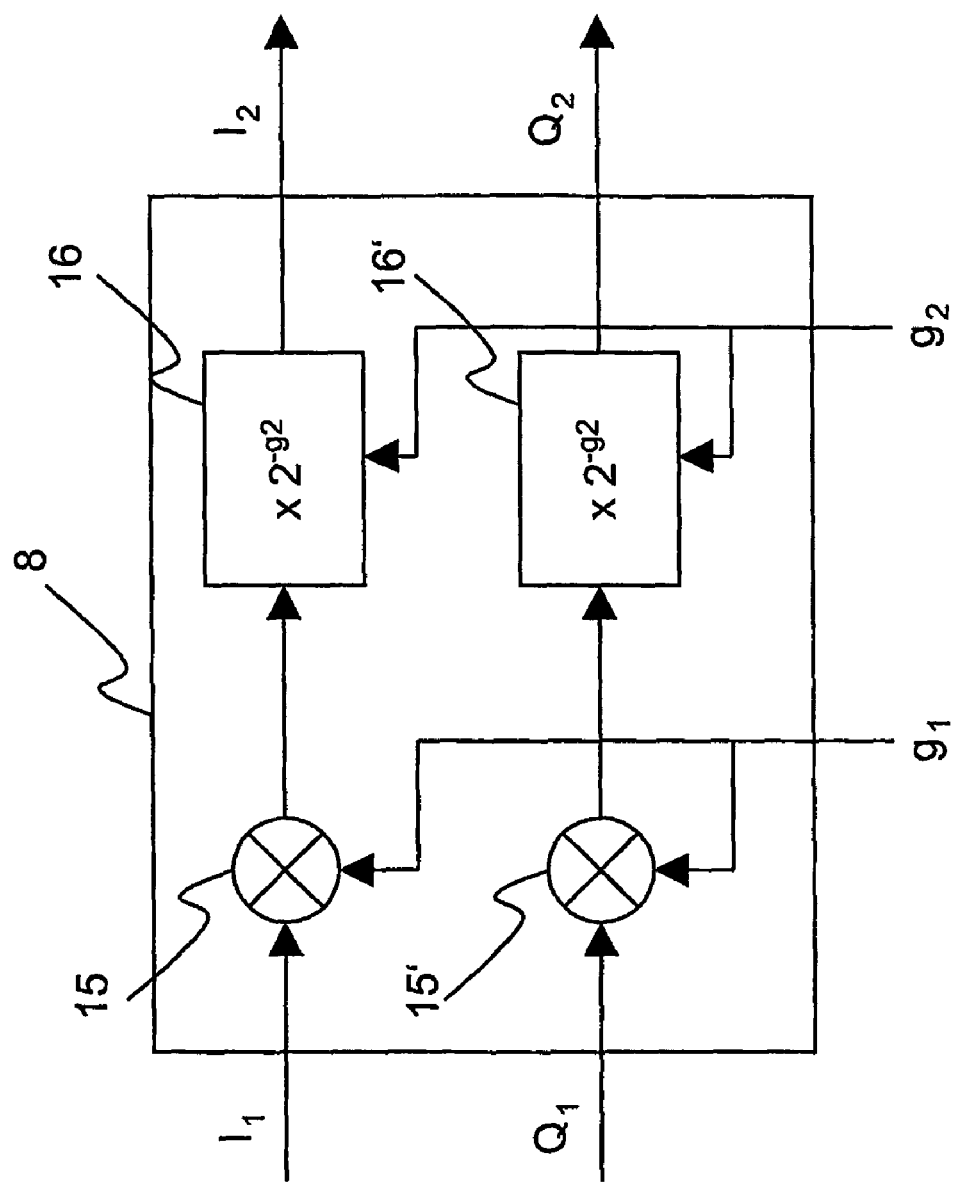
FIG. 2 shows the construction of a digital, two-stage amplifier belonging to the mobile communication device.

For respective ones of the two signals $I_1$, $Q_1$, the digital amplifier 8 may be constructed from respective first stages 15 and 15' and respective second stages 16 and 16' (see FIG. 2). The first stages 15, 15' are used to set a high signal level using finely graduated factors. The second stages 16, 16' operate with a coarser graduation. With them, low signal levels are made available when the signal-to-noise ratio required is reduced. This is useful in a UMTS, for example, if very low transmitted powers are to be obtained while less stringent demands are to be met in respect of the signal-to-noise ratio and if the dynamic range of the analog amplifier 4 is designed to be small to allow a high signal-to-noise ratio to be achieved.

As a supplement to FIG. 1, in the arrangement shown in FIG. 3 there are N=3 programmable amplifiers 4 connected in series. The parameters that determine the gain factors for the digital gain and the analog gain are stored in the microcontroller 5. It is possible in this way for self-calibration of the analog amplifiers to be performed in the following manner. The self-calibration simplifies the calibration of the analog amplifier or analog amplifiers 4 when the mobile communication device is being manufactured. Also, the self-calibration may take place repeatedly even during the time when the mobile communication device is operating, which means that the effects of changes in operating voltage and changes in temperature on the transmitted power are compensated for.

Let the gain of the νth of the N programmable analog amplifiers 4 be:

$$A_\nu[k_\nu] \text{ where } k_\nu \in [1, \ldots, n_\nu], \nu \in [1, \ldots, N],$$

and where $k_\nu$ is the gain-determining parameter of the νth amplifier.

Let the gain of the digital amplifier be:

$$D[k] \text{ where } k \in [1, \ldots, m],$$

and where k is the gain-determining parameter of the digital gain.

The gain made up of the individual gains is thus, ignoring the constant effects of the digital-to-analog converter 2 and the modulator 3:

$$G = D[k] \prod_{\nu=1}^{N} A_\nu[k_\nu] = \frac{z(t)}{x(t)}$$

On the assumption that there are one digital amplifier and four analog amplifiers, the following table gives an example of possible parameters.

| Parameters $k, k_\nu$ | $D[k]$ m = 32 | $A_1[k_1]$ $n_1 = 4$ | $A_2[k_2]$ $n_2 = 2$ | $A_3[k_3]$ $n_3 = 2$ | $A_4[k_4]$ $n_4 = 2$ |
|---|---|---|---|---|---|
| 1 | 0 dB | 0 dB | 0 dB | 0 dB | 0 dB |
| 2 | 0.25 dB | 1 dB | 4 dB | 4 dB | 16 dB |
| 3 | 0.5 dB | 2 dB | | | |
| 4 | 0.75 dB | 3 dB | | | |
| 5 | 1 dB | | | | |
| ... | ... | | | | |
| 32 | 7.75 dB | | | | |

The overall gain with a first set of parameters $k^{(1)}$, $k_\nu^{(1)}$ will be designated $G^{(1)}$ below. The overall gain with a second set of parameters $k^{(2)}$, $k_\nu^{(2)}$ will be designated $G^{(2)}$ below.

For the self-calibration, the amplifiers 4, 8 are first programmed with a first set of parameters so that the overall gain obtained is:

$$G^{(1)} = D[k^{(1)}] \cdot \Pi A_\nu[k_\nu^{(1)}].$$

The output power that effectively results from this is measured from z(t) by means of the uncalibrated power sensor 9. What is obtained is a measured gain of $M^{(1)} \cdot G^{(1)}$, where $M^{(1)}$ is a power transmission factor.

A second set of parameters is then programmed that is intended to produce the same overall gain. What is therefore obtained is:

$$G^{(1)} = G^{(2)} = D[k^{(2)}] \cdot \Pi A_\nu[k_\nu^{(1)}].$$

What are to apply in this equation are:

$$k^{(1)} \neq k^{(2)}$$

$$k_\nu^{(1)} = k_\nu^{(2)} \forall \nu \in [1, N]/\lambda,$$

$$k_\lambda^{(1)} \neq k_\lambda^{(2)}$$

where λ is between 1 and N.

From the above table, $G^{(1)}$ may for example be:

$$G^{(1)} = D[5] \cdot A_1[1] \cdot A_2[1] \cdot A_3[1] \cdot A_4[1]$$
$$= 1 \text{ dB} + 0 \text{ dB} + 0 \text{ dB} + 0 \text{ dB} + 0 \text{ dB}$$
$$= 1 \text{ dB}.$$

$G^{(2)}$ may then be $$G^{(2)} = D[0] \cdot A_1[2] \cdot A_2[1] \cdot A_3[1] \cdot A_4[1]$$
$$= 0 \text{ dB} + 1 \text{ dB} + 0 \text{ dB} + 0 \text{ dB} + 0 \text{ dB}$$
$$= 1 \text{ dB},$$

λ being equal to 1 in this case.

The output power that results from the second set of parameters is then measured. A measured gain $M^{(2)} \cdot G^{(2)}$ is obtained when this is done. A relationship is defined between this measurement and the measurement $M^{(1)} \cdot G^{(1)}$:

$$\frac{M^{(1)}G^{(1)}}{M^{(2)}G^{(2)}} \approx \frac{D[k^{(1)}] \cdot A_\lambda[k_\lambda^{(1)}]}{D[k^{(2)}] \cdot A_\lambda[k_\lambda^{(2)}]}.$$

Because $G^{(1)}$ and $G^{(2)}$ are intended to be approximately equal, the measured difference between $M^{(1)}$ and $M^{(2)}$ can be ignored and it can thus be stated that $M^{(1)}=M^{(2)}$.

Because $D[k^{(1)}]$ and $D[k^{(2)}]$ are implemented digitally, and are thus precisely known, the ratio $A_\lambda[k_\lambda^{(1)}]/A_\lambda[k_\lambda^{(2)}]$ can be stated.

If, in example 2 above, 1 dB is measured when the parameters are set in accordance with $G^{(1)}$ and 1.2 dB is measured when the parameters are set in accordance with $G^{(2)}$, this is a sign that, at the parameter setting $k_1=2$, the analog amplifier $A^{(1)}$ is amplifying not by the theoretical amount of 1 dB but by 1.2 dB. This value is then entered in a table of corrections. The following table is an example of a table of corrections of this kind, which in this case gives the differences $\Delta A_\nu$ between the gains measured and the gains expected.

| Parameters $k, k_\nu$ | $\Delta A_1[k_1]$ $n_1 = 4$ | $\Delta A_2[k_2]$ $n_2 = 2$ | $\Delta A_3[k_3]$ $n_3 = 2$ | $\Delta A_4[k_4]$ $n_4 = 2$ |
|---|---|---|---|---|
| 1 | 0 dB | 0.1 dB | −0.2 dB | 0.6 dB |
| 2 | 0.2 dB | −0.3 dB | 0.2 dB | −0.7 dB |
| 3 | 0.1 dB | | | |
| 4 | 0.6 dB | | | |

All the other possible parameters of the amplifiers are placed in a relationship to one another in the same way. Once that has been done, a table of corrections giving all the values of gain determined for the parameters $k_\nu$ of the analog amplifiers 4 can then be stored in the mobile communication device 10 (see FIG. 3) for a given set of parameters that has been set, after only one absolute measurement by a calibrated measuring device 11 (see FIG. 3). By reference to this table, it is possible to make a correction that corrects, as appropriate and with the help of the digital amplifier 8, the analog gains that show a difference. The final outcome is that the amplifiers are thus set each time in such a way that the desired transmitted power is obtained even when the analog amplifiers are affected by changes in temperature or changes in the operating voltage. A recalibration, i.e. an adjustment of the table, can take place sporadically or cyclically.

The self-calibration may also take place in the following manner:

As described above, a first overall gain $G^{(1)}$ is set and $M^{(1)}G^{(1)}$ is measured by the power sensor 9. A second overall gain $G^{(2)}$ having altered parameters is then set and the digital gain $D^{(2)}$ is changed until such time as the power $M^{(2)}G^{(2)}$ measured for $G^{(2)}$ exactly corresponds to the first measurement $M^{(1)}G^{(1)}$. If for example the analog gain $A_1[2]$ is not, as it should be in theory, 1 dB but 1.25 dB in this case then, in this procedure, the digital gain $D[2]$ is changed by −0.25 dB, thus giving 1 dB. An entry can then be made in the table of corrections to say that $A_1[2]$ is not 1 dB but 1.25 dB. With this procedure, any non-linear measurement of power that may occur is compensated for and the ratio $G^{(2)}/G^{(1)}$ of the levels of gain is fixed with greater accuracy.

A further use for digital amplification arises with UMTS when only very low transmitted levels are to be set. In such cases, the UMTS standard lowers the requirements to be met by the signal-to-noise ratio, which means that the analog-to-digital converter no longer has to be fully modulated to allow them to be met. The range of adjustment of the digital amplifier can thus be widened to cover smaller factors because additional attenuation can be produced less expensively and with greater accuracy in the digital amplifier 8 than in the analog amplifiers 4.

The setting of a very low transmitted level, such as −20 dB for example, can be accomplished as follows in the foregoing example. The analog amplifier or the analog amplifiers are set to their lowest gain (0 dB), and the digital amplifier 8 (see FIG. 2) is set to −20 dB. This value divides up in this case into the coarsely graduated factor ($g_2=4\rightarrow 2^4$, corresponds to −24 dB) and the finely graduated factor (+4 dB from the first table).

The invention claimed is:

1. A method of setting a transmitted power of a mobile communication device, the method comprising:
   amplifying digital signals ($I_1$, $Q_1$) from a data source belonging to the mobile communication device by a digital gain by means of a controllable digital amplifier to generate amplified digital signals ($I_2$, $Q_2$);
   converting the amplified digital signals ($I_2$, $Q_2$) into analog signals ($I_3$, $Q_3$);
   modulating the analog signals onto a carrier frequency ($f_T$);
   amplifying the modulated analog signals ($X_3$) by an analog gain in at least one controllable analog amplifier to produce amplified analog signal ($X_4$); and
   matching the digital gain (D) and the analog gain (A), as a function of a difference between a measured power signal (p(t)) derived from the amplified analog signal ($X_4$) that represents a measurement of the transmitted power and a desired power signal that represents a desired value for the transmitted power from a base station, wherein the matching combines the digital gain and the analog gain to produce an overall gain and the desired value for the transmitted power by controlling the digital gain to minimize a contribution of the analog gain to the overall gain.

2. The method of claim 1, further comprising:
   only adjusting the analog gain (A) in steps.

3. The method of claim 1, further comprising:
   applying the digital gain (D) in two steps, wherein an exact setting of a signal level is made in a first step by means of finely graduated factors and the signal level is set in a second step, at a reduced signal-to-noise ratio, with more coarsely graduated factors.

4. The method of claim 3, wherein the first step further comprises:
   multiplying the digital signals ($I_1$, $Q_1$) by a first parameter ($g_1$) to produce multiplied signals, and the second step further comprises:
   applying the multiplied signals and a second parameter ($g_2$) to a shift unit to produce the amplified digital signals ($I_2$, $Q_2$).

5. The method of claim 1, further comprising:
   performing a self-calibration process for the at least one controllable analog amplifier that corrects the analog gain.

6. The method of claim 5, wherein the self-calibration process further comprises:
   repeatedly storing matching parameters in a micro-controller; and
   determining the digital gain and the analog gain in the micro-controller based upon the stored matching parameters.

7. The method of claim 1, wherein the mobile communication device is a Universal Mobile Telecommunication System (UMTS) device.

8. The method of claim 1, further comprising:
measuring the transmitted power at time t with a power sensor coupled to an input node of an antenna; and
producing the measured power signal (p(t)) based on a result of the measuring step.

9. The method of claim 1, wherein the step of amplifying the digital signals ($I_1$, $Q_1$) further comprises:
multiplying the digital signals ($I_1$, $Q_1$) by a first parameter ($g_1$) to produce multiplied signals; and
applying the multiplied signals and a second parameter ($g_2$) to a shift unit to produce the amplified digital signals ($I_2$, $Q_2$).

10. The method of claim 1, further comprising:
storing matching parameters in a micro-controller; and
determining the digital gain and the analog gain in the micro-controller based upon the stored matching parameters.

11. The method of claim 1, further comprising:
calculating a table of corrections for the analog gain after only one absolute measurement by a calibrated measuring device.

12. The method of claim 11, further comprising:
storing the table of corrections in a micro-controller.

13. The method of claim 12, further comprising:
recalibrating the table of corrections in a sporadic manner.

14. The method of claim 12, further comprising:
recalibrating the table of corrections in a cyclical manner.

15. An apparatus that sets a transmitted power of a mobile communication device, the apparatus comprising:
a controllable digital amplifier that receives digital signals ($I_1$, $Q_1$) from a data source belonging to the mobile communication device and amplifies the digital signals to ($I_2$, $Q_2$);
a digital to analog converter that receives the amplified digital signals ($I_2$, $Q_2$) from the controllable digital amplifier and converts the amplified signals to produce analog signals ($I_3$, $Q_3$);
a frequency modulator that receives the analog signals ($I_3$, $Q_3$) from the digital to analog signal and modulates the analog signals ($I_3$, $Q_3$) to produce modulated analog signals ($X_3$);
one or more analog amplifiers that amplify the modulated analog signals ($X_3$) to produce an amplified analog signal ($X_4$); and
a control circuit that controls an overall gain of the digital amplifier and the one or more analog amplifiers to produce a desired value of the transmitted power by comparing a measured value of the transmitted power derived from the amplified analog signal ($X_4$) to the desired value of the transmitted power, wherein the control circuit controls the digital gain to minimize a contribution of the analog gain to the overall gain.

16. The apparatus of claim 15, wherein the controllable digital amplifier further comprises:
a first amplifier stage comprising multipliers; and
a second amplifier stage comprising a shift unit.

17. The apparatus of claim 15, further comprising:
an uncalibrated power sensor that approximately detects the transmitted power and makes the detected transmitted power available to the control circuit as the measured value.

18. The apparatus of claim 15, further comprising:
a calibrated measuring device that enables calculation a table of corrections for the analog gain after only one absolute measurement.

19. The apparatus of claim 15, wherein each of the one or more analog amplifiers receives a separate control line ($g_3$, $g_4$, $g_5$) to adjust the analog gain.

20. The apparatus of claim 15, wherein the mobile communication device is a Universal Mobile Telecommunication System (UMTS) device.

* * * * *